(12) United States Patent
Koh (10) Patent No.: US 7,735,761 B2
(45) Date of Patent: Jun. 15, 2010

(54) FOOD WASTE DISPOSAL APPARATUS

(76) Inventor: Chun Il Koh, 140-64 Sangye-dong, Nowon-gu, Seoul (KR) 139-200

( * ) Notice: Subject to any disclaimer, the term of this patent is extended or adjusted under 35 U.S.C. 154(b) by 668 days.

(21) Appl. No.: 11/696,139

(22) Filed: Apr. 3, 2007

(65) Prior Publication Data

US 2008/0210790 A1 Sep. 4, 2008

(30) Foreign Application Priority Data

Mar. 2, 2007 (KR) .................. 10-2007-0020868

(51) Int. Cl.
*B02B 1/08* (2006.01)
*B02B 5/02* (2006.01)
*B02C 21/00* (2006.01)
(52) U.S. Cl. ............... 241/65; 241/101.3; 241/606
(58) Field of Classification Search ........... 241/73, 241/41, 65, 101.3, 15, 606
See application file for complete search history.

(56) References Cited

U.S. PATENT DOCUMENTS 5,695,130 A * 12/1997 Csendes .............. 241/19
6,551,401 B1 * 4/2003 Winistorfer et al. ....... 118/303

2004/0007337 A1 * 1/2004 Vuorinen ............ 162/55

FOREIGN PATENT DOCUMENTS

| KR | 20-194-0024804 | 11/1994 |
| KR | 20-1995-0005245 | 7/1995 |
| KR | 20-1995-0007395 | 9/1995 |
| KR | 20-1995-0007541 | 9/1995 |
| KR | 10-1996-0004300 | 2/1996 |
| KR | 20-0270982 | 4/2002 |
| KR | 10-0535699 | 12/2005 |
| KR | 10-2006-0019663 | 3/2006 |

* cited by examiner

*Primary Examiner*—Bena Miller
(74) *Attorney, Agent, or Firm*—John K. Park; Park Law Firm (57) ABSTRACT

A food waste disposal apparatus decomposing organic waste by inputting microbes during a process of drying the food waste, characterized in that the food waste disposal apparatus comprises a mixing basin installed in a housing, and a rotational shaft with a plurality of mixing blades, in which a hot water tank is installed near the mixing basin for heating the mixing basin, microbes in a microbe tank are sprayed into the mixing basin in order to enhance the efficiency of decomposition of food waste, a drain water tank with a drain pipe is provided under the mixing basin for collecting and discharging waste water, and a cleansing device installed in the drain water tank for cleansing an inner space of the drain water tank, and a control touch panel, in which functions for operation are set is installed, so that the functions can be selected in a touching manner.

4 Claims, 12 Drawing Sheets

| Base Screen-2:auto | | | |
|---|---|---|---|
| YYYY/MM/DD | HH:MM:SS | auto | menu |
| agitator speed | agitator current | shell temp | chamber temp |
| 0000 | 0000 | 0000 | 0000 |

| | | |
|---|---|---|
| total operating | 000A/00 m | agitator |
| agitator operating | 00 m/00 m | drug |
| shell water supply | 00 s/00 m | washing |
| washing working | 00 s/00 m | heater 1 |
| drug operating | 00 s/00 m | heater 2 |
| discharge valve | 00 s/00 m | water v/v |
| spare | 00 s/00 m | discharge |
| manual | auto start | auto stop | error reset |

FOOD WASTE DISPOSAL APPARATUS

BACKGROUND OF THE INVENTION

1. Field of the Invention

The present invention relates to a food waste disposal apparatus, which decomposes and terminates organic matter contained in food waste by inputting microbes (decomposition agent) into the food waste during a process of dehydrating the food waste.

In more detail, the food waste disposal apparatus is structured in a manner such that a rotational shaft having a plurality of mixing blades is installed on the horizontal center line of a mixing basin so as to be operated by a gear motor. The gear motor, which is a mixing motor, is an inverter type, so that it can endure a high load, and has a structure in which it can conduct forward rotation and reverse rotation when it encounters foreign objects. Two hot water tanks provided with heaters are installed near the mixing basin, and a spray device is installed at an upper position of the mixing basin, so that hot water from the hot water tanks can be sprayed into the mixing basin through the spray device. Further, a microbe tank (decomposition agent tank) is installed separately from the hot water tank, and microbes (decomposition agent) from the microbe tank can also be sprayed into the mixing basin along with the hot water, in order to enhance the efficiency of decomposition of food waste and deodorization. The bottom of the mixing basin is realized as a perforated plate, and a drain water tank with a drain pipe is provided under the perforated plate of the mixing basin, so that drain water generated during a process of disposal and termination of food waste is collected in the drain water tank and is then discharged, and the mixing basin and the drain water tank can be cleansed by high-pressure hot water and air. Further, a control touch panel having operation functions for operating the food waste disposal apparatus is provided on an upper plate of a housing that protects the mixing basin, so that a plurality of functions is commanded in a touching manner.

2. Description of the Related Art

Generally, organic waste, such as food waste, contains a large amount of fibrous material of vegetables and animals, protein, carbohydrates and calcium. Accordingly, if the organic waste is disposed of in a landfill unchanged, without being decomposed, leachate generated from the organic waste permeates into the soil, resulting in the contamination of ground water.

Conventional food waste disposal technologies using microbes are disclosed in Korean Utility Model Publication Nos. 20-1995-5245, 20-1995-7541, 20-1995-7395, Korean Patent Laid-Open Publication Nos. 10-1996-4300, and Korean Utility Model Laid-Open Publication Nos. 20-1994-24804. These technologies are related to methods and apparatuses of fertilizing and composting food waste or organic waste.

The conventional methods and apparatuses can reduce some of the organic matter in food waste or organic waste, but are insufficient with respect to disposal efficiency and capacity because they take a long period to decompose organic matter and they cannot perfectly decompose organic matter. As a result, odors are generated due to the hazardous gas generated upon the incomplete decomposition of food waste.

Korean Utility Model No. 20-270982 discloses "Apparatus for Decomposing Organic Waste", Korean Patent Laid-Open Publication No. 10-2006-19663 discloses "Apparatus for Treating Food Waste", and Korean Patent No. 10-535699 discloses "Structure of Mixing Basin of Apparatus for Treating Food Waste".

Korean Utility Model Registration No. 20-270982 discloses "Apparatus for Decomposing Organic Waste", which comprises a rotational shaft having a plurality of arm blades, installed along a central horizontal line of a mixing basin provided in a housing, a rotation device which includes a gear motor, a driving sprocket, a linking sprocket, and a chain, for rotating the rotational shaft, a hot water tank, and a spray device with a plurality of spray nozzles, which is installed in an upper part of the mixing basin for spraying hot water from the hot water tank into the mixing basin, in which the inner temperature of the mixing basin can be adjusted by selectively supplying the hot water from the hot water tank provided with a pre-heater.

Korean Patent Laid-Open Publication No. 10-2006-19663 discloses "Apparatus for Treating Food Waste", in which food waste introduced through an entrance formed in an upper portion of a mixing basin is pulverized when it passes through a pulverizing mill and falls down, the pulverized food waste is mixed by mixing blades and decomposed, and then the decomposed food waste is discharged, in which the mixing basin is cleaned by spraying water using a spray device installed in an upper portion of the mixing basin.

Korean Patent No. 10-535699 discloses "Structure of Mixing Basin of Apparatus for Treating Food Waste" which comprises a mixing basin having mixing blades therein, an upper plate which has a screen and is fixed to a lower end portion of the mixing basin, and a lower plate having a drain in a center portion thereof, which is provided under the upper plate and is integrated with the upper plate, in which food waste introduced through an entrance of the mixing basin and onto the upper plate is mixed by the mixing blades, and leachate from the food waste is drained through the screen, flows down to the lower plate and is then discharged through the drain provided to the lower plate.

The above-described food waste disposal apparatuses are operated using manual switches in an analog manner. Accordingly, they have problems in that the manipulation thereof is inconvenient and in that they cannot be selectively operated in an automatic manner and a manual manner. Further, since hot water cannot be supplied into the mixing basin, the food waste treatment capacity and efficiency thereof are low, and it is difficult to clean the inside of the mixing basin, so that odors linger around the apparatus.

Further, since a cleansing device for cleansing the lower plate, on which leachate collects, is not provided, odors occur. Still further, since the mixing basin does not have a leachate discharge device, leachate overflowing from the mixing basin cannot be easily discharged, so that the apparatus cannot be smoothly operated.

SUMMARY OF THE INVENTION

Therefore, the present invention has been made in view of the above problems, and it is an object of the present invention to provide an improved food waste disposal apparatus comprising a mixing basin with a waste introduction hole having a door, a rotational shaft installed on a horizontal central line, which is provided with a plurality of mixing blades and can be driven by a gear motor, a hot water tank with a heater, which is installed on one side of the mixing basin, a spray device installed inside the mixing basin at an upper portion of the mixing basin, a perforated plate serving as a bottom plate of the mixing basin, a drain water tank with a drain pipe, which is provided under the perforated plate, a washing nozzle installed in the drain water tank, and a control panel installed on the upper plate of a housing protecting the mixing basin, which has functions for operation of the food waste disposal apparatus.

It is a further object of the present invention to provide a food waste disposal apparatus in which a hot water tank having a heater is installed on one side of a mixing basin (mixing basin), hot water from the hot water tank is sprayed into the mixing basin by a spray device installed in an upper portion of the mixing basin, microbes (decomposition agent) in a microbe tank (decomposition agent tank) which is installed separately from the hot water tank are sprayed into the mixing basin along with the hot water by the spray device in order to enhance the efficiency of decomposition of food waste and perform deodorization, the drain water tank can gather and discharge leachate generated when treating food waste and can be cleansed by high-pressure hot water sprayed through a washing nozzle installed in the drain water tank, and the apparatus can be manipulated using a control panel installed on the upper plate of a housing for protecting the mixing basin in a touching manner.

In accordance with one aspect of the present invention, the above and other objects can be accomplished by the provision of a food waste disposal apparatus, comprising a mixing basin installed in a housing and having an introduction hole with a door, a rotational shaft with a plurality of mixing blades, which is installed on a horizontal central line of the mixing basin and can be driven by a gear motor, a hot water tank installed on one side of the mixing basin and provided with a heater for heating water therein, a microbe tank installed in the housing and connected to the supply pipe, a spray device with a plurality of spray nozzles provided to the supply pipe, which is installed in an upper part of and in the mixing basin, for spraying microbes along with hot water into the mixing basin, a perforated plate serving as a bottom plate of the mixing basin, a drain water tank with a drain pipe, which is installed under the perforated plate for collecting drain water from the mixing basin, an overflow pipe connected to an upper part of the mixing basin, a duct connected to an upper end portion of the overflow pipe for discharging odor and waste water rising in the mixing basin, a washing device for cleansing the inside of the drain water tank, a cleansing device for cleansing the inside of the drain water with hot water, and a control touch panel installed on an upper plate of the housing protecting the mixing basin.

BRIEF DESCRIPTION OF THE DRAWINGS

The above and other objects, features and other advantageous effects of the present invention will be more clearly understood from the following detailed description taken in conjunction with the accompanying drawings, in which.

DESCRIPTION OF THE PREFERRED EMBODIMENTS

The above-described objects, advantageous effects and features of the present invention will be apparent from the following description with reference to the accompanying drawings.

The structure of the food waste disposal apparatus 1 according to one embodiment of the present invention will be described below.

A housing for protecting a mixing basin 10 installed therein comprises a support frame 7, a front plate 4, a rear plate 5, and a pair of side plates 6, which are integrated as a single body. The housing further has an upper plate 3 comprising an inclined front upper plate 3-1 and a rear upper plate 3-2. On the inner surface of the front plate 4, a distribution board 13 is installed to supply power to, or to be connected to, a variety of electrical devices.

Each of the front plate 4 and the side plates 6 is provided with a plurality of handles 6-1, so that the food waste disposal apparatus 1 can be easily transported and moved. Further, each of the side plates 6 has a vent hole 6-2 so that inner heat can be discharged therethrough. The lower corners of the support frame 7 are provided with casters 8 so that the food waste disposal apparatus 1 can be moved, or, alternatively, fixed in place.

The casters 8 provided to the lower corners of the support frame 7 are structured in a manner such that a vertically movable bar 8-3 is provided in the center portion of a caster cover 8-1 and the vertically movable bar 8-3 is moved in vertical directions by the operation of a vertical movement adjustment plate 8-4, so that it protrudes from the bottom surface of the caster cover 8-1 when it is lowered and is hidden in the caster cover 8-1 when it is lifted. As a result, the apparatus can be easily fixed on the floor. Further, a wheel 8-2 is installed on one side of the caster cover 8-1 by a shaft, so that the apparatus can be easily moved in a state in which the vertically movable bar 8-3 is received in the caster cover 8-1, that is, in the state in which the vertically movable bar 8-3 is raised.

The inclined front upper plate 3-1 has an introduction hole 2-3 in a center portion thereof, and a door 9 is provided to cover the introduction hole 2-3. A control touch panel 14, which controls the operation of the food waste disposal apparatus 1 when it is touched, is installed around the door 9.

The door 9 is fixed to the inclined front upper plate 3-1 at a first end (rear end) thereof in an opening and closing manner using attachment blocks 9-2 and hinges 9-1. The door 9 has a handle 9-3 near a second end portion (front end portion) thereof. Shock absorbers 9-4 are installed at respective side end portions of the door 9 in a manner such that the shock absorbers 9-4 are in contact with the surface of the inclined front upper plate 3-1 when the door is closed, so that the door 9 can be easily opened and closed.

In the above-described housing, a mixing basin 10 having an open upper end is installed at a position which is distanced from the bottom of the housing, in which the upper end of the mixing basin 10 is aligned with the introduction hole 2-3. Further, a front support plate 17 and a rear support plate 18 are fixed to the front surface and the rear surface of the mixing basin 10 by a front support bar 17-1 and a rear support bar 18-1, respectively, so that the mixing basin 10 is stably supported.

Further, the bottom of the mixing basin 10 installed in the housing is open, and a perforated plate (net-shaped body) 12 is fixed to the open bottom of the mixing basin 10. A drain water tank 11 having a drain pipe 11-1 is integrated with the perforated plate 12 and is installed under the perforated plate 12.

A washing device for cleansing the inner space of the drain water tank 11 with high pressure water is structured in a manner such that a supply pipe 36, on which a plurality of spray nozzles 37 is installed at regular intervals, is connected to a hot water tank 15, and washing nozzles 11-2 are installed in the drain water tank 11 near the front edge portion and the rear edge portion, respectively, to be directed toward the opposite edges thereof, so that hot water (cleansing water) from the hot water tank 15 is sprayed at high pressure into the drain water tank 11. Accordingly, the inner spaces of the mixing basin 10 and the drain water tank 11 can be cleansed.

The hot water tank 15 is installed under the mixing basin 10 near the rear edge of the mixing basin 10, and has heaters 16 (a first heater 16-1 and a second heater 16-2). The first heater 16-1 and the second heater 16-2 heat water in the hot water tank 15, thereby heating the mixing basin 10.

The supply pipe 36 is installed inside the mixing basin 10 at an upper end portion thereof, and the plurality of spray nozzles 37 is arranged on the supply pipe 36 at regular intervals. Further, a microbe tank 35 connected to the supply pipe 36 is installed in the housing, and microbes or decomposition agents in the microbe tank 35 are sprayed into the mixing basin 10 through the supply pipe 36 and the spray nozzles 37, operated by a micro-pump 24.

A rotational shaft 20 is installed in the mixing basin 10 along a horizontal central line using a support bearing 20-1 and a sealing means, and a plurality of blade support bars 22 is installed on the rotational shaft 20 by blade fixing chips 23 at regular intervals. Each blade support bar 22 is provided with a mixing blade 21.

The rotational shaft 20 has a first end that protrudes from the side surface of the mixing basin 10, and the first end is engaged with a linking sprocket 27. A gear motor 25 is also installed inside the housing, and a driving sprocket 26 is installed on the rotational shaft of the gear motor 25, and a chain 28 is engaged with the driving sprocket 26 and the linking sprocket 27. The chain 28 is contact with a tension adjustment roller 29 installed on a support plate 29-1 by a shaft, so that the restoring force of the chain 28 can be adjusted.

A duct 30 is installed on a side of the mixing basin 10, on which the drain pipe 11-1 is connected, and an upper end portion of the duct 30 communicates with an upper end portion of the mixing basin 10. The lower end portion of the duct 30 has a reverse-T shape, with two open ends. One open end of the lower end portion of the duct 30 is connected to the drain pipe 11-1, and the other open end of the lower end portion of the duct 30 is exposed outside the housing through the side plate 6. Above the duct 30, an overflow pipe 31 having a filter therein is installed to communicate with an upper end portion of the mixing basin 10, so that odors and leachate flowing through the overflow pipe 31 can also be discharged through the duct 30.

A cleansing device for cleansing the inner space of the drain water tank 11 with air is structured in a manner such that an air pump 19 is connected to the supply pipe 36, on which the spray nozzles 37 are arranged at regular intervals. Accordingly, the inner spaces of the mixing basin 10 and the drain water tank 11 can be cleansed using high pressure air.

Figure 1:
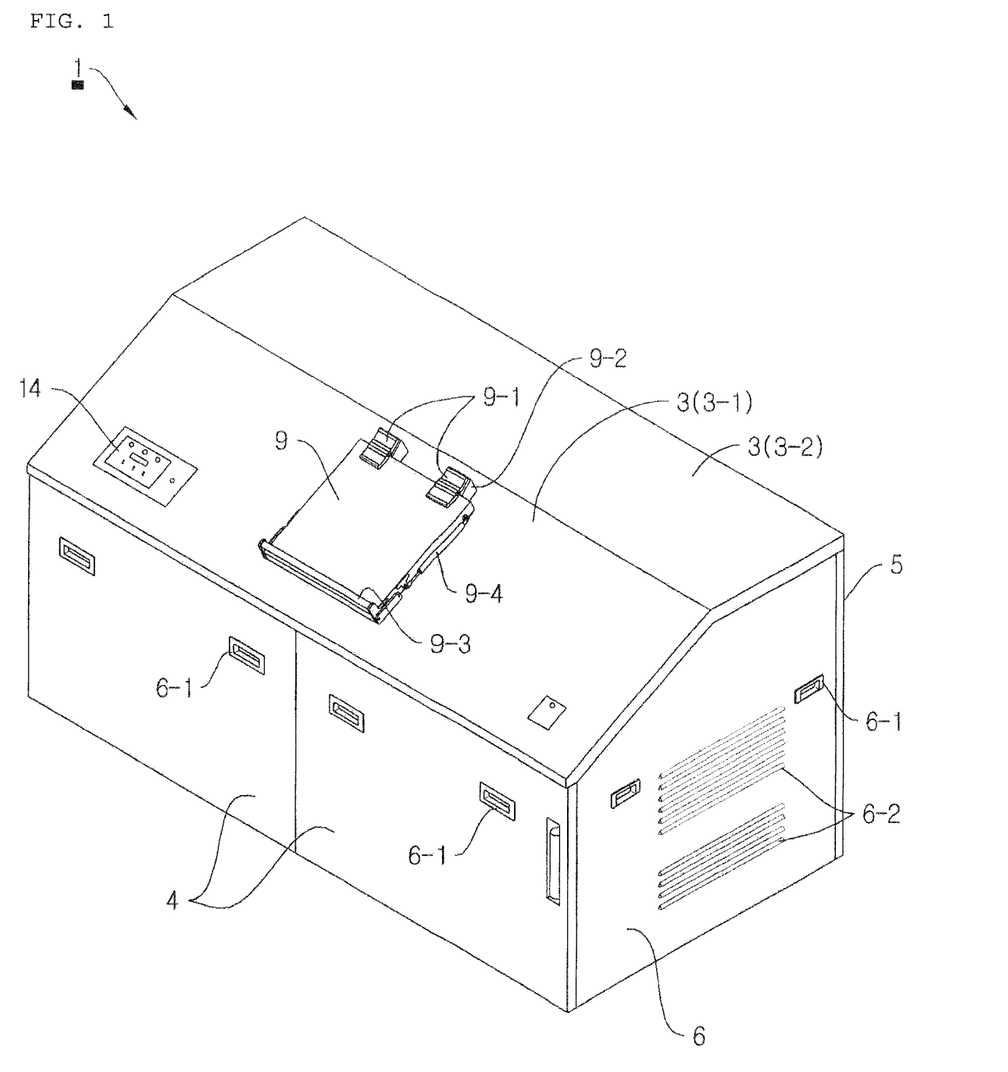
FIG. 1 is a perspective view illustrating a food waste disposal apparatus according to one embodiment of the present invention.
Figure 2A:
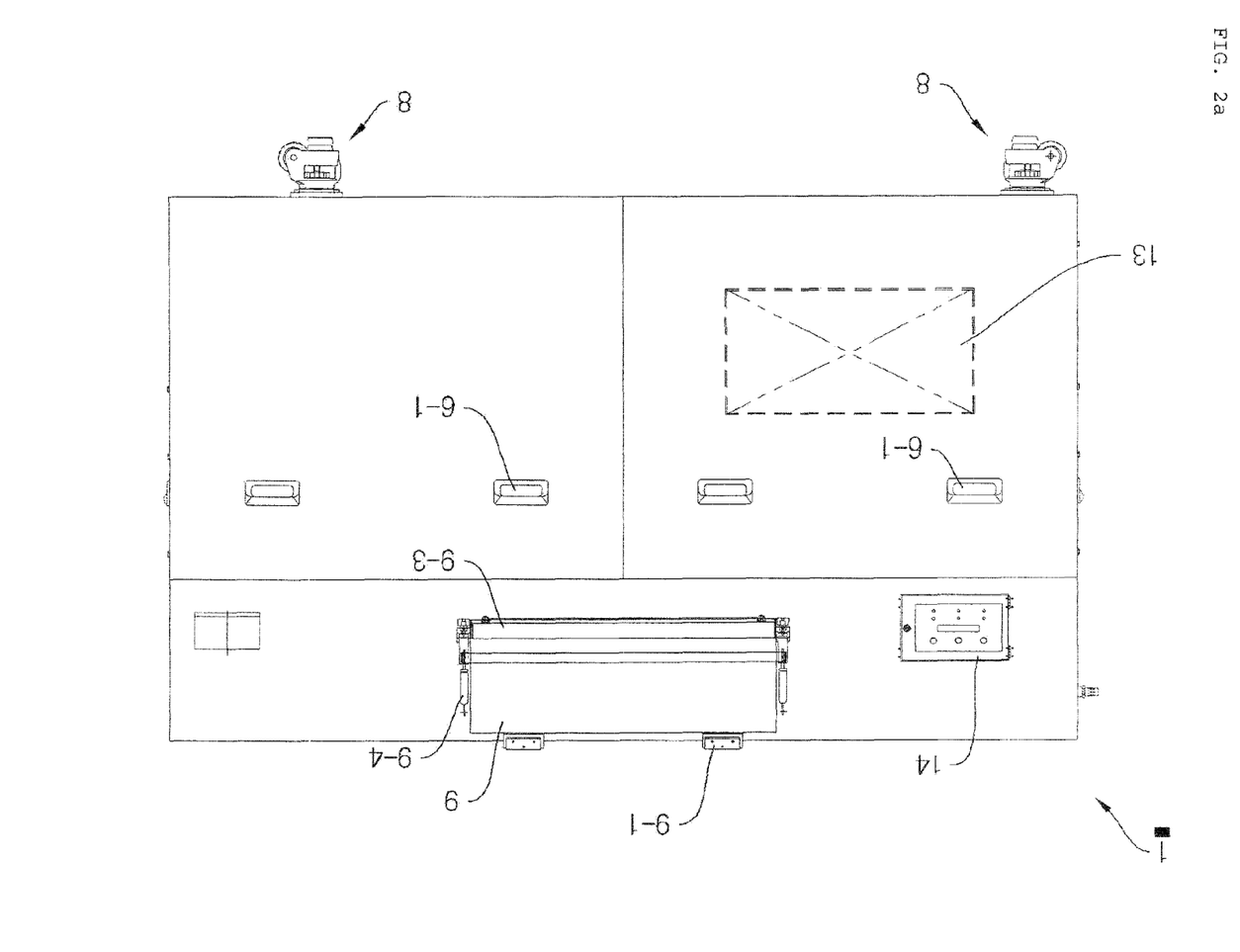
FIG. 2a, FIG. 2b and FIG. 2c are a front view, a plan view and a side vide, respectively, illustrating the food waste disposal apparatus according to one embodiment of the present invention.
Figure 2B:
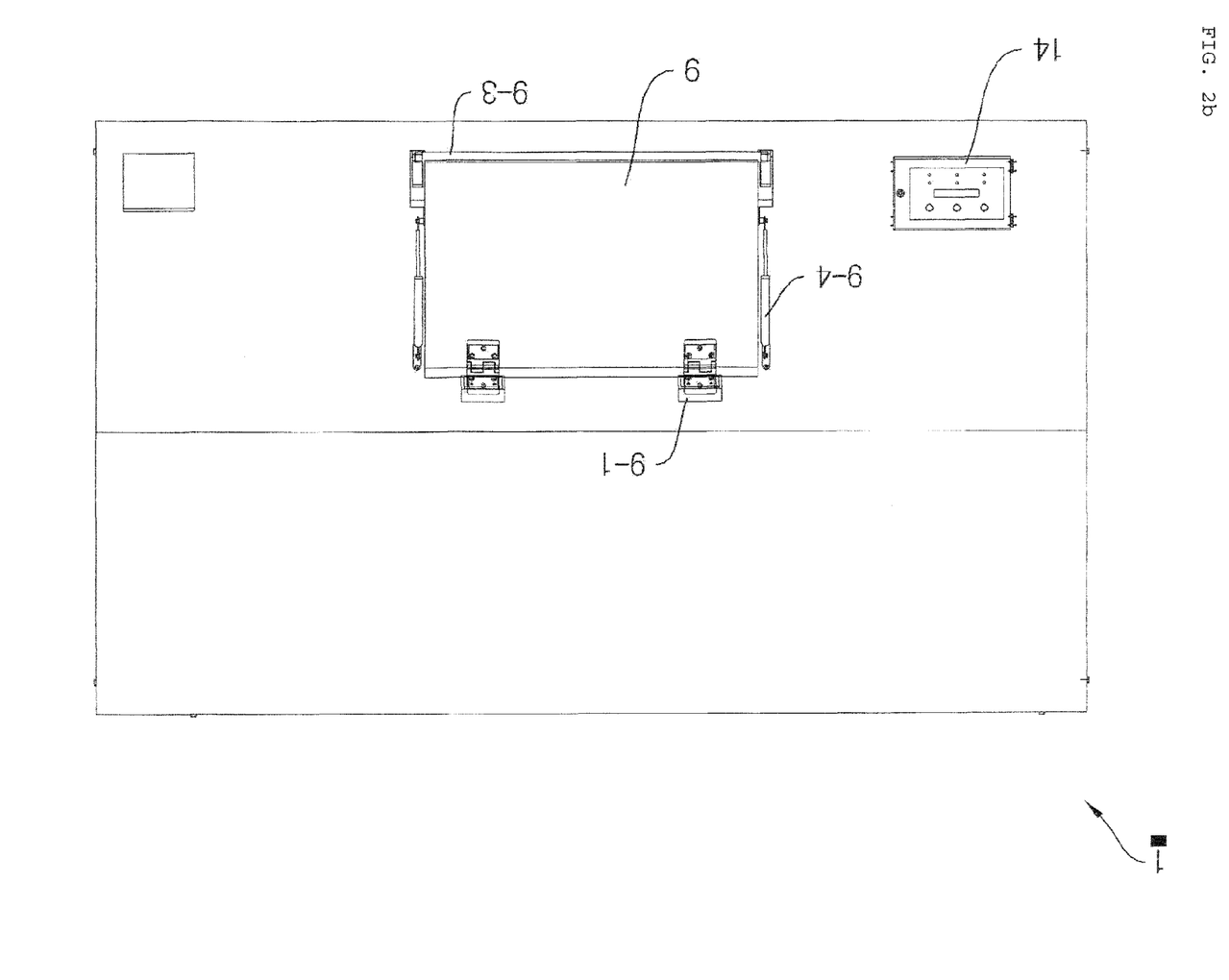
Figure 2C:
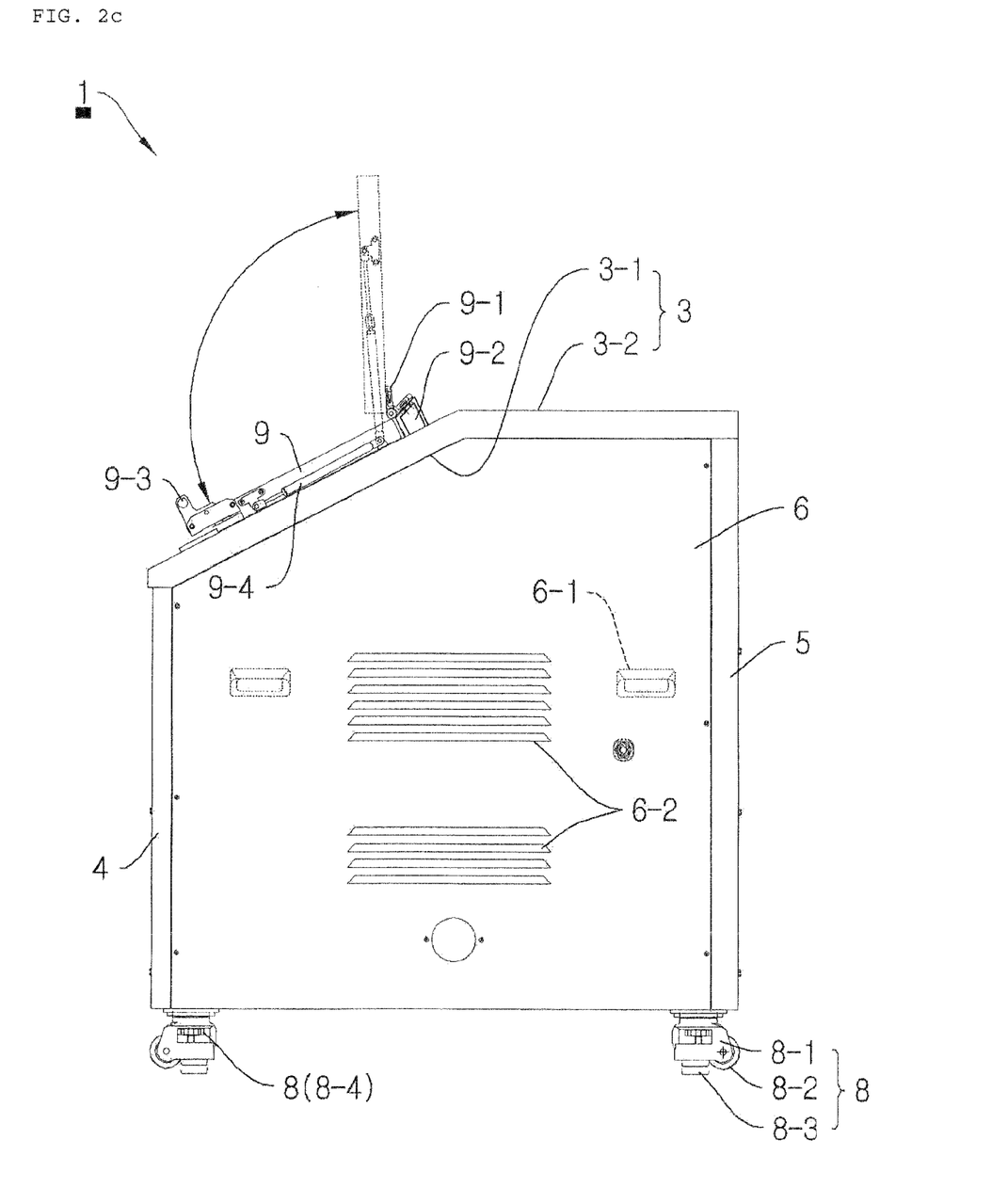
Figure 3A:
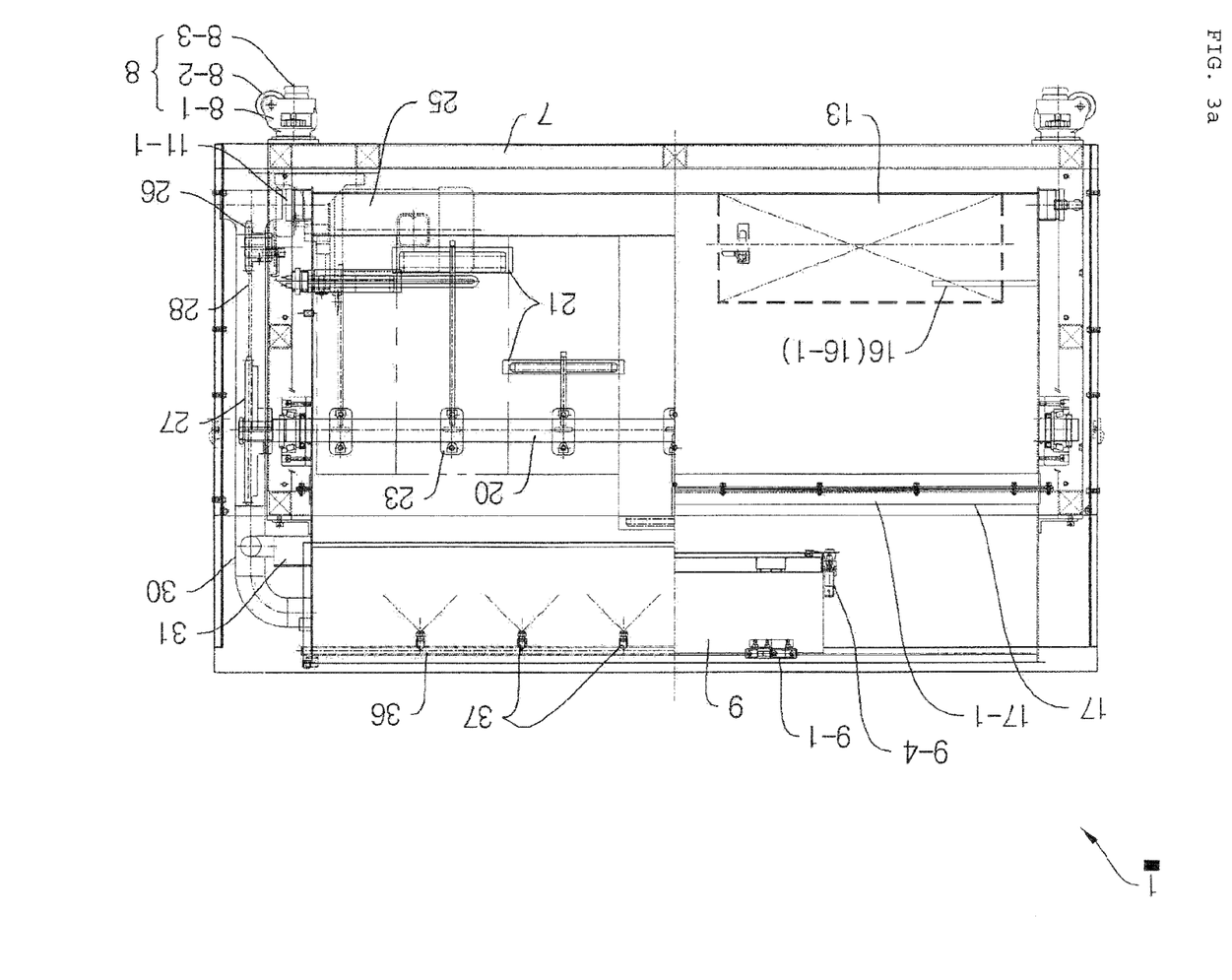
FIG. 3a, FIG. 3b, FIG. 3c, and FIG. 3d are a front view, a plan view, a left side view and a right side view, respectively, illustrating the food waste disposal apparatus according to one embodiment of the present invention.
Figure 3B:
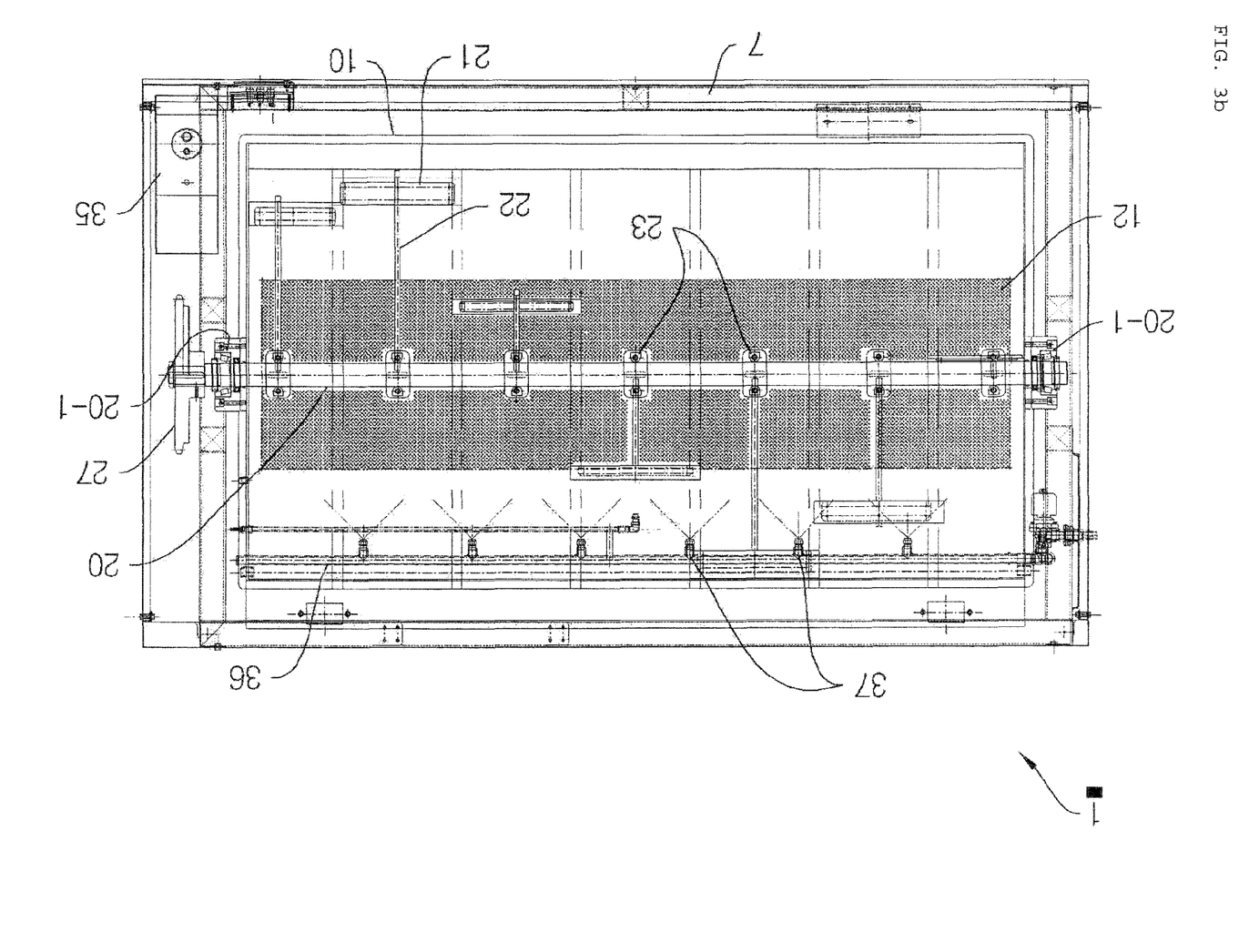
Figure 3C:
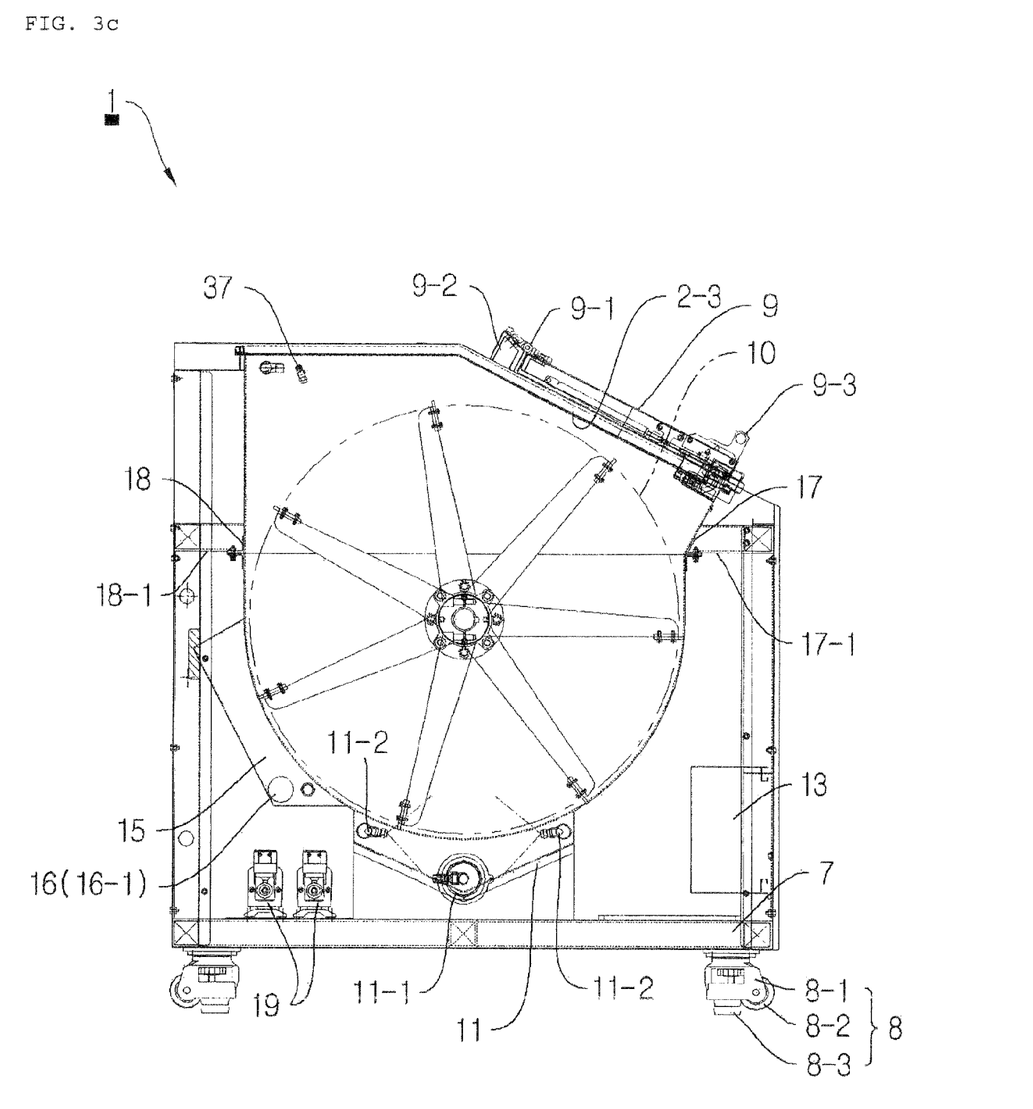
Figure 3D:
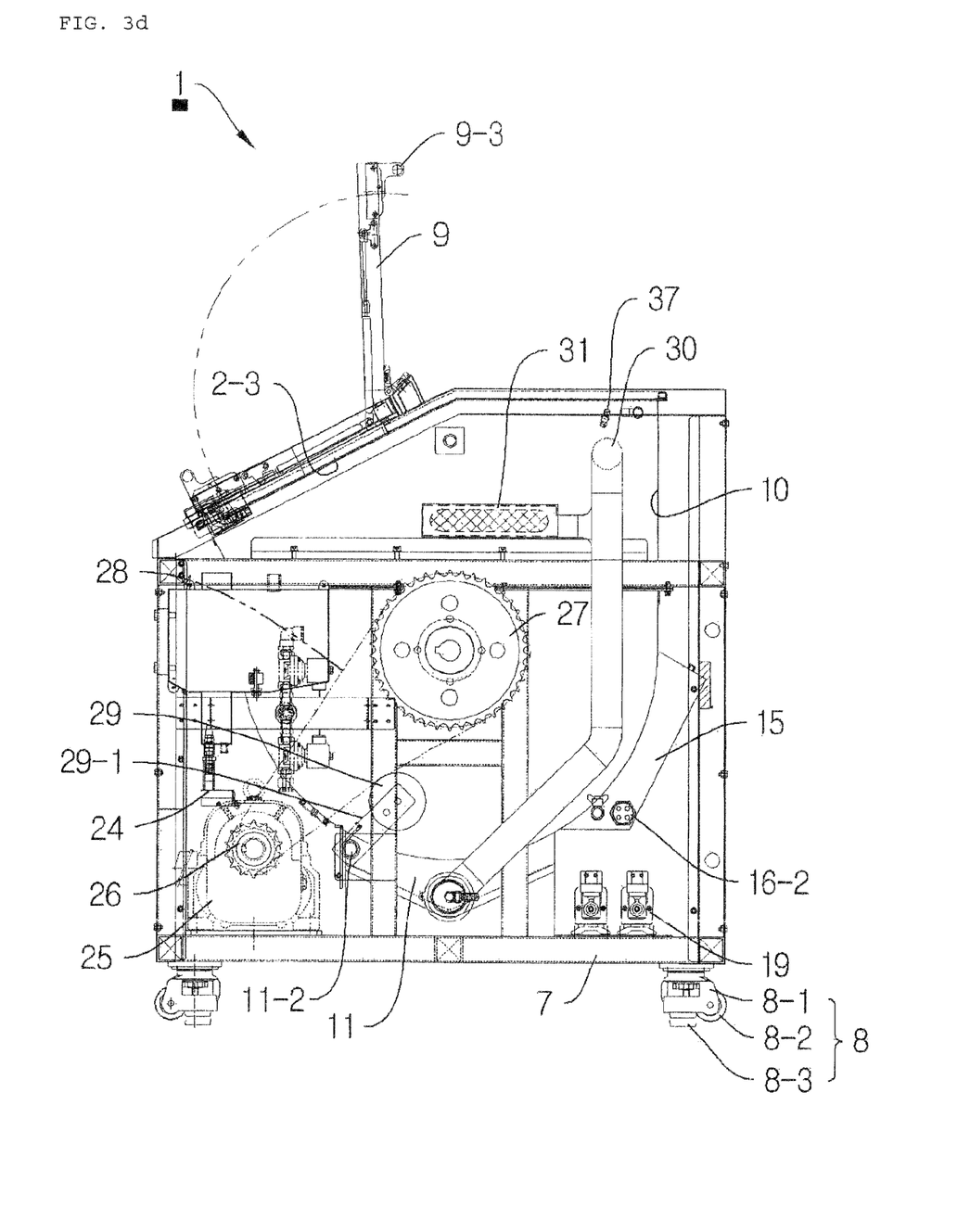
Figure 4A:
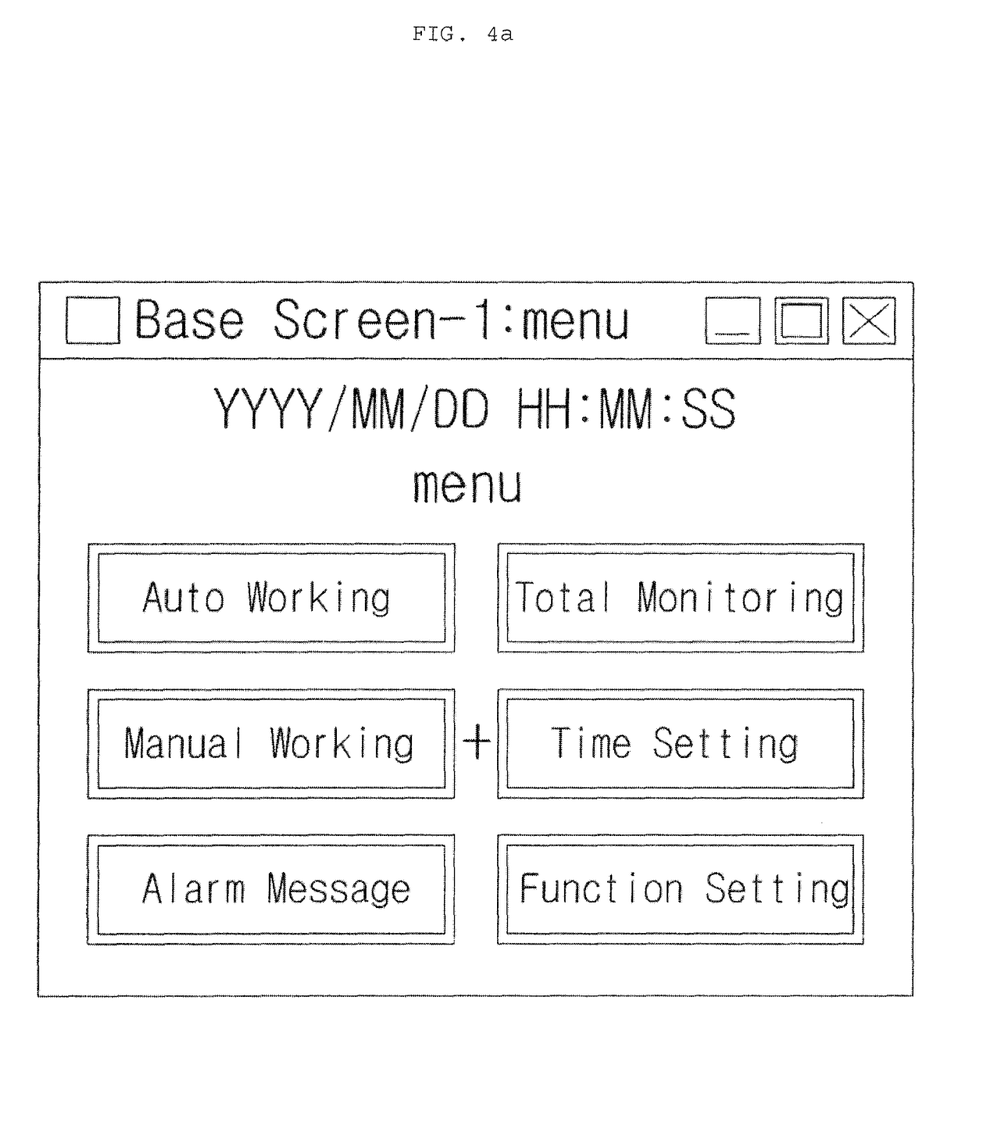
FIG. 4a, FIG. 4b, FIG. 4c, and FIG. 4d are views illustrating menus displayed on a touch panel of the food waste disposal apparatus according to one embodiment of the present invention.

The control touch panel 14, installed on the inclined front upper plate 3-1, displays a basic menu shown in FIG. 4a. Each item in the basic menu can be selected in a touching manner, and the functions of the food waste disposal apparatus can be performed when the items in the basic menu are selected.

Figure 4B:
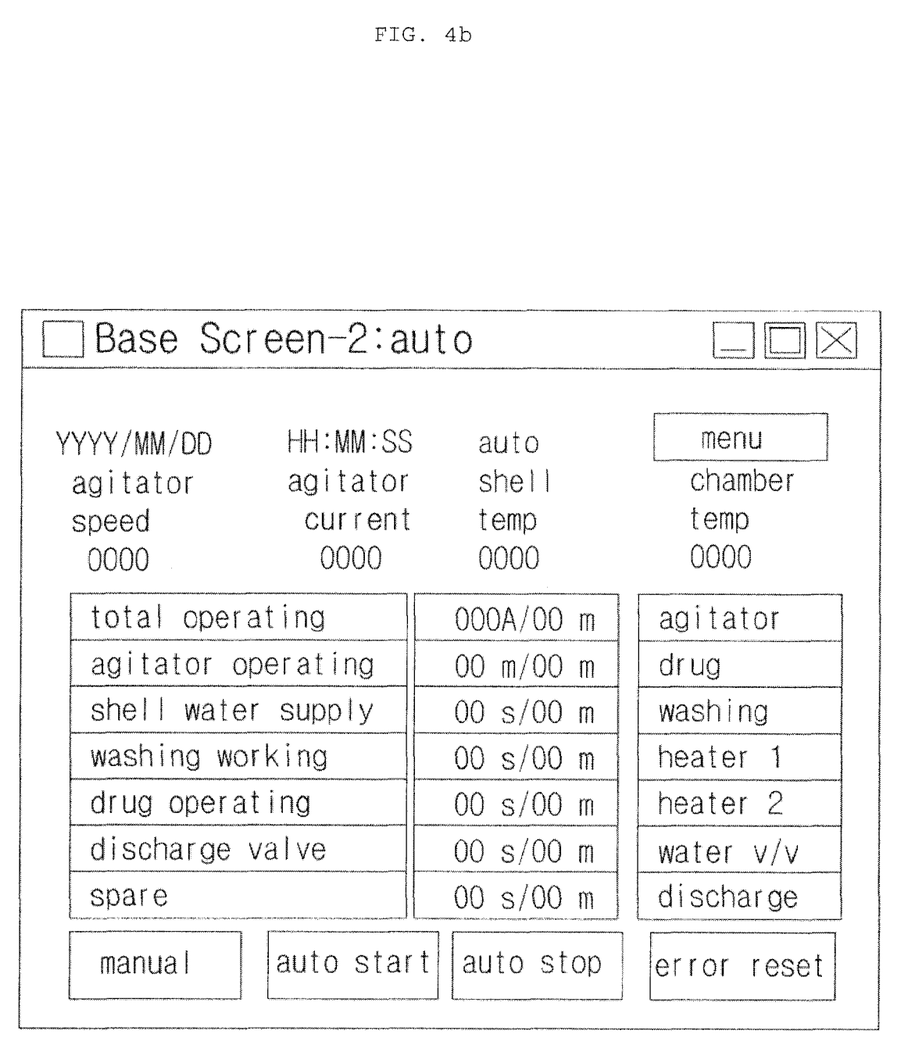
Figure 4C:
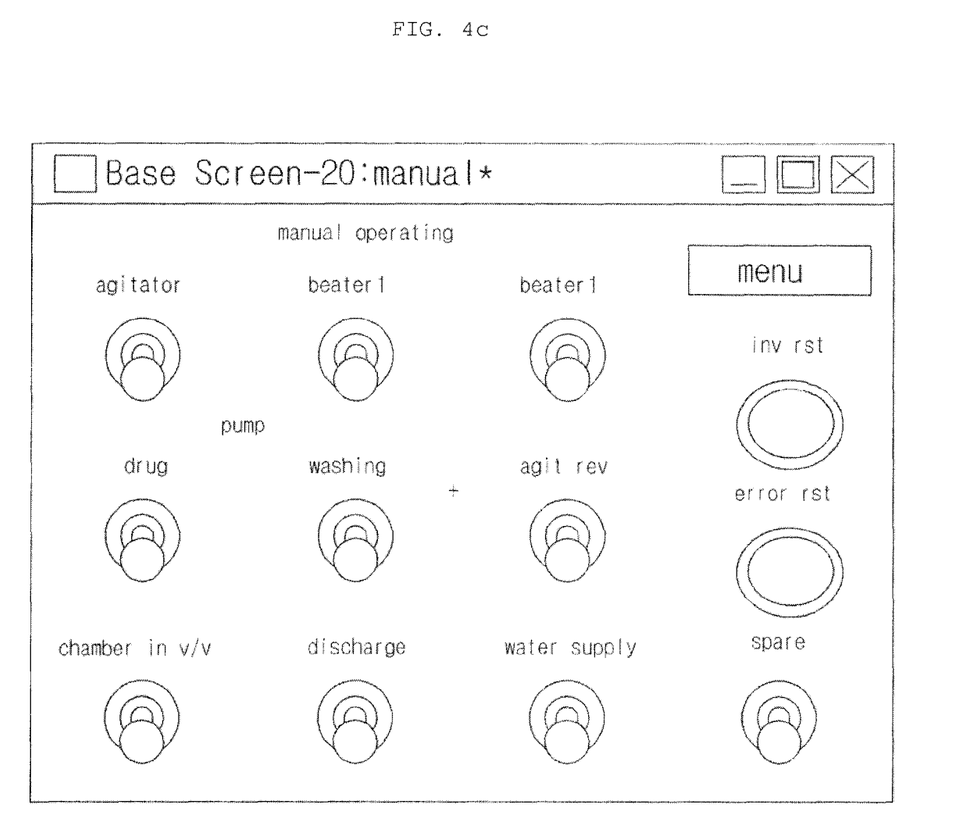

The menu has items for an automatic operation mode and a manual operation mode, so that the food waste disposal apparatus can be operated in the automatic operation mode or in the manual operation mode according to the item selected on the menu. If the item of the automatic operation mode is selected, the menu shown in FIG. 4b is displayed on the control touch panel, and the food waste disposal apparatus is operated as programmed. If the item of the manual operation mode is selected, on and off items for turning on and off a plurality of functions of the food waste disposal apparatus are displayed as shown in FIG. 4c, so that each function can be performed or skipped according to selection.

Figure 4D:
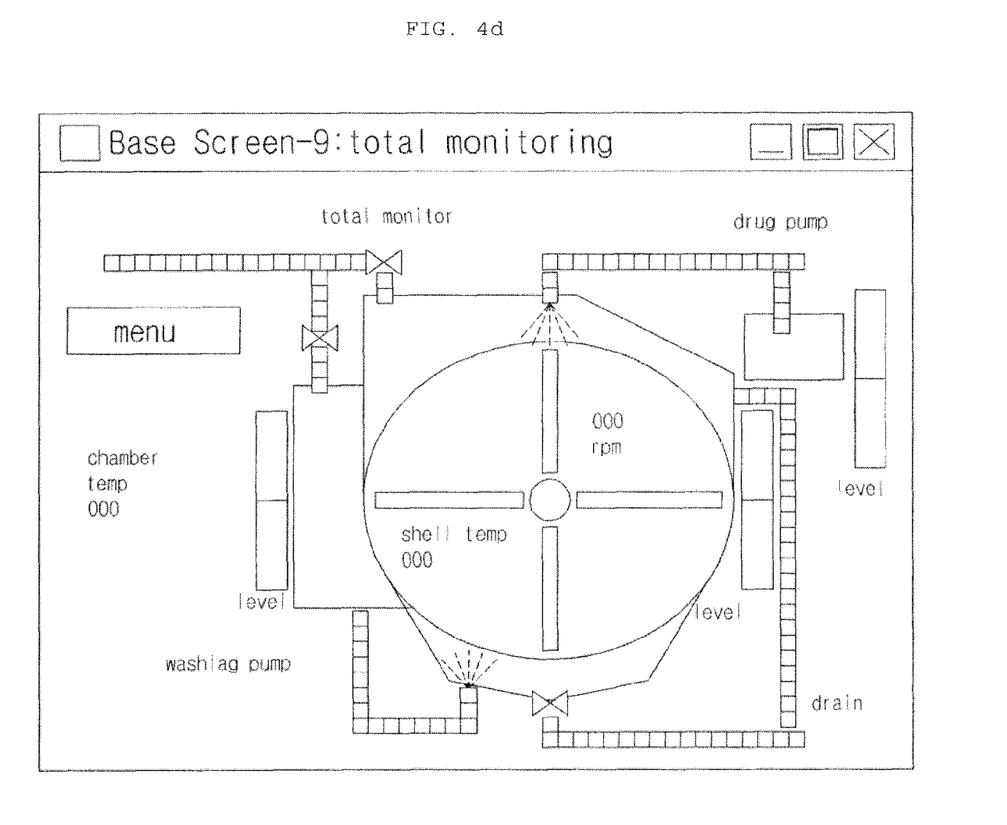

If an item of a total monitoring mode in the menu is selected, the operating status of each function of the food waste disposal apparatus 1 is displayed on the control touch panel regardless of whether the food waste disposal apparatus 1 is operated in the automatic operation mode or in the manual operation mode, as shown in FIG. 4d.

The food waste disposal apparatus 1 provides a time setting mode, an alarm message mode and a function setting mode. Accordingly, periods for functions, such as total operation, agitator operation, water supply, washing work, decomposition agent operation, discharge valve, and pause can be set. Further, whenever every function starts and ends, such starting and ending can be indicated with an alarm. Still further, the operational status of every function can be selectively displayed. The operational status of functions such as agitator, decomposition agent, washing, heater1, heater2, water valve and discharge is displayed using flashing lamps.

Hereinafter, the operation of the food waste disposal apparatus 1 according to an embodiment of the present invention will be described.

First, the door 9 of the food waste disposal apparatus 1 is opened, a food waste is introduced into the mixing basin 10 through the introduction hole 2-3, and then the door 2 is closed to cover the introduction hole 2-3.

In the state in which the food waste is disposed in the mixing basin 10, the main switch (not shown) is turned on, so that the food waste disposal apparatus 1 is powered.

When the power is supplied, the basic menu shown in FIG. 4a is displayed on the control touch panel 14 installed on the inclined front upper panel 3-1 of the upper panel 3. At this time, the operation of the food waste disposal apparatus 1 can be started by touching the items on the menu.

The food waste disposal apparatus 1 can be operated in the automatic operation mode or in the manual operation mode by selecting the items on the menu. If the item corresponding to the automatic operation mode is selected, a screen, such as the example shown in FIG. 4b, is displayed on the control touch panel 14, and thus the food waste disposal apparatus 1 is operated as programmed. If the item corresponding to the manual operation mode is selected, on/off switches for the functions shown in FIG. 4c are displayed on the control touch panel 14. At this time, an operator can manipulate the on/off switches so that the functions are performed or cancelled.

If the item of the total monitoring mode in the menu is selected, a screen, such as the example shown in FIG. 4d, is displayed on the control touch panel 14 regardless of whether the food waste disposal apparatus 1 is operated in the automatic operation mode or in the manual operation mode. That is, the operational status of each function of the food waste disposal apparatus 1 is displayed on the control touch panel 14.

By selecting the items of the time setting mode, the alarm message mode and the function setting mode, the periods for the functions of total operation, agitator operation, water supply, washing work, decomposition agent operation, discharge valve, and pause can be set, starts and ends of the functions can be indicated using an alarm, and the operational status of every function can be selectively displayed. Further, the operational status of the functions of agitator, decomposition agent, washing, heater1, heater2, water valve, and discharge are indicated using a flashing lamp.

If the food waste disposal apparatus 1 is powered on in the state in which the hot water tank 15 is filled with water, the first heater 16-1 and the second heater 16-2 generate heat to boil the water, and indication lamps heater1 and heater2 flash in order to indicate that the first heater 16-1 and the second heater 16-2 are operated.

If the water in the hot water tank 15 is heated by the first heater 16-1 and the second heater 16-2, heat from hot water is conducted to the mixing basin 10, so that the food waste in the mixing basin 10 is also heated.

As described above, in the state in which the food waste in the mixing basin 10 is heated by heat from the hot water, the operation of the agitator is started.

At this time, if the gear motor 5 is driven, the driving sprocket 26 rotates and the linking gear 27 is also rotated due to the chain 28 engaged with the driving sprocket 26. As a result, the rotational shaft 20 connected to the linking gear 27 is also rotated.

If the rotational shaft 20 is rotated, the mixing blades 21, arranged at regular intervals by the blade support bars 22, move around the rotational shaft 20, thereby mixing the food waste in the mixing basin 10. Waste water generated when the food waste is fixed is introduced into the overflow pipe 31 provided with the filter, and is also discharged through the duct 30 into an external BOD treatment device (not shown).

While the food waste in the mixing basin 10 is mixed by the mixing blades 21, the food waste is still heated by heat from the hot water in the hot water tank 15 equipped with the first heater 16-1 and the second heater 16-2. Heat, odor and vapor generated while the food waste is heated rises in the mixing basin 10 and is exhausted outside the housing via the duct 30. As programmed, mixing and drying are continuously performed until the food waste is completely dried.

When the food waste in the mixing basin 10 is mixed and dried by the rotation of the mixing blades 21, the micro-pump 24 is operated periodically, or once for a predetermined period, so that the microbes in the microbe tank 35 are pumped out and sprayed onto the food waste through the spray nozzle 37. Accordingly, protein, fat, sugar, fatty acids, and cellulose contained in the food waste are decomposed by the microbes.

Leachate, which is generated while the food waste is mixed and dried by the mixing blades 21 and which is decomposed by the microbes, falls through the perforated plate 12, is collected in the drain water tank 11, and is discharged to the external BOD treatment device (not shown) through the drain pipe 11-1.

When the mixing and drying of the introduced food waste is completed, the residue in the mixing basin 10 is discharged outside the mixing basin 10 through a discharge hole or a discharge device (not shown), and it is used as compost.

After the food waste is completely mixed and dried, and the residue is completely discharged, the micro-pump 24 is driven again in order to spray the hot water in the hot water tank 15 into the mixing basin 10 through the spray nozzle 37 of the supply pipe 36 at a high speed, thereby cleansing and sterilizing the inner space in the mixing basin 10. At this time, hot water is sprayed at high pressure from the washing nozzle 11-2 installed in the drain water tank 11, so that the inner space of the drain water tank 11 can also be cleansed and sterilized.

The cleansing water generated when the mixing basin 10 is cleansed is collected in the drain water tank 11 through the perforated plate 12, and the cleansing water generated when the drain water tank 11 is cleansed is discharged into an external BOD treatment device (not shown) through the drain pipe 11-1.

After the mixing basin 10 and the drain water tank 11 are cleansed, the air pump 19 is driven to strongly blow air into the mixing basin through the spray nozzles 37 of the supply pipe 36, so that the moisture on the surface of the mixing basin 10 is blown down and discharged through the perforated plate 12, and thus is collected in the drain water tank 11. In this instance, since the air is forcefully blown into the mixing basin 10 so that it can reach the drain water tank 11, the moisture in the mixing basin 10 and the drain water tank 11 is discharged into the external BOD treatment device (not shown) through the drain pipe 11-1.

Thanks to the above-described cleansing and air-blowing processes, the inner space of the mixing basin 10 and the drain water tank 11 can be cleaned. After the introduced food waste is mixed and dried, and the mixing basin 10 and the drain water tank 11 are completely cleansed, the main switch (not shown) is turned off, and thus the operation of the food waste disposal apparatus 1 according to the embodiment of the present invention is completed. By repeating the above-described procedure, food waste is treated and terminated.

As described above, the food waste disposal apparatus according to the present invention is structured in a manner such that the rotational shaft with the plurality of mixing blades is installed on the horizontal center line of the mixing basin so as to be rotated by a gear motor. A hot water tank equipped with the heaters is installed in the housing near the mixing basin, and the spray device for spraying microbes or decomposition agent along with hot water into mixing basin is installed. The mixing basin has a bottom which is formed as a perforated plate, and the drain water tank having the drain pipe is installed under the bottom of the mixing basin. The washing device and the cleansing device for cleansing the inner space of the drain water tank with high pressure air and the hot water are installed, and the control touch panel for controlling the operation of the food waste disposal apparatus is installed on the upper plate of the housing, which protects the mixing basin. The hot water in the hot water tank, equipped with the heaters and installed near the mixing basin, is sprayed into the mixing basin by the spray device installed at the upper end portion of the mixing basin, and microbes (decomposition agent) charged in the microbe tank (decomposition agent tank) are also sprayed into the mixing basin by the spray device, thereby enhancing the efficiency of decomposition of food waste and eliminating odors generated during the food waste decomposition process. Leachate generated during the food waste decomposition process is collected in the drain water tank provided under the perforated plate of the mixing basin and is discharged outside the mixing basin. Further, the inner space of the drain water tank can be cleansed by the washing nozzles installed in the drain water tank using the hot water and high pressure air. Further, the food waste disposal apparatus can be operated by the control touch panel installed on the upper plate of the housing, which protects the mixing basin, in a touching manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A food waste disposal apparatus, comprising a mixing basin installed in a housing and having an introduction hole with a door, and a rotational shaft with a plurality of mixing blades, which is installed along a horizontal central line of the mixing basin and can be driven by a gear motor, in which:
   a hot water tank, provided with a heater, is installed near the mixing basin to heat the mixing basin,
   a spray device, structured in a manner such that a plurality of spray nozzles is arranged on a supply pipe at regular intervals, is installed in an upper part of the mixing basin, the supply pipe being connected to a microbe tank installed in the housing, so that microbes in the microbe tank can be sprayed into the mixing basin along with hot water,
   a perforated plate is integrated with a bottom of the mixing basin and a drain water tank is installed under the perforated plate, so that waste water generated from the mixing basin is collected in the drain water tank and is then discharged,
   a duct is installed in a manner such that an upper end portion thereof can communicate with the mixing basin, and an overflow pipe is installed to communicate with an upper end portion of the mixing basin, so that odor and waste water can be discharged through the overflow pipe and the duct,
   an inner space of the drain water tank can be cleansed with hot water by a washing device,
   an inner space in the drain water tank can be cleansed with high pressure air by a cleansing device, and
   a control touch panel, in which functions to operate the food waste disposal apparatus are set, is installed on an upper plate of the housing protecting the mixing basin.

2. The food waste disposal apparatus according to claim 1, wherein the washing device for cleansing the inner space of the drain water tank at high pressure is structured in a manner such that the hot water tank is connected to the supply pipe, on which the plurality of spray nozzles is arranged at regular intervals, and washing nozzles are installed in the drain water tank near a front edge and a rear edge, respectively, so as to be directed toward opposite edges thereof, so that the inner spaces of the mixing basin and the drain water tank can be cleansed by spraying hot water in the hot water tank at high pressure.

3. The food waste disposal apparatus according to claim 1, wherein the cleansing device for cleansing the inner space of the drain water tank using high pressure air is structured in a manner such that an air pump is connected to the supply pipe on which the spray nozzles are arranged at regular intervals, so that the inner spaces of the mixing basin and the drain water tank can be cleansed by high pressure air.

4. The food waste disposal apparatus according to claim 1, wherein the control touch panel displays a menu including items corresponding to functions to be performed by elements of the food waste disposal apparatus, wherein the menu comprises:
   an item for an automatic operation mode, in which the food waste disposal apparatus is operated as programmed;
   an item for a manual operation mode, in which functions of the food waste disposal apparatus are operated manually, as set by an operator;
   an item for a total monitoring mode, in which operational status of the functions of the food waste disposal apparatus is displayed on the control touch panel;
   an item for a time setting mode;
   an item for an alarm message mode;
   an item for a function setting mode; and
   a flashing lamp unit for indicating the operational status of the functions of the food waste disposal apparatus using flashing lights.

\* \* \* \* \*